United States Patent
Lai et al.

(10) Patent No.: US 7,983,207 B2
(45) Date of Patent: Jul. 19, 2011

(54) ROUTING METHOD AND ROUTING PATH RECOVERY MECHANISM IN WIRELESS SENSOR NETWORK ENVIRONMENT

(75) Inventors: Jun-Yu Lai, Taipei County (TW); Kuei-Li Huang, Kaohsiung (TW); Jui-Tang Wang, Keelung (TW); Chien-Chao Tseng, Hsinchu (TW); Chao-Nan Wu, Taipei County (TW)

(73) Assignee: National Chiao Tung University, Hsinchu (TW)

( * ) Notice: Subject to any disclaimer, the term of this patent is extended or adjusted under 35 U.S.C. 154(b) by 97 days.

(21) Appl. No.: 12/485,113

(22) Filed: Jun. 16, 2009

(65) Prior Publication Data

US 2010/0260071 A1   Oct. 14, 2010

(30) Foreign Application Priority Data

Apr. 14, 2009   (TW) ................................ 98112298 A (51) Int. Cl.
*H04H 20/71*   (2008.01)
(52) U.S. Cl. ......................................... 370/312; 370/349
(58) Field of Classification Search ........................ None
See application file for complete search history.

(56) References Cited

U.S. PATENT DOCUMENTS

| | | | | |
|---|---|---|---|---|
| 2005/0286456 | A1* | 12/2005 | McNew et al. | 370/312 |
| 2006/0052121 | A1* | 3/2006 | Suzuki et al. | 455/502 |
| 2009/0122733 | A1* | 5/2009 | Ruy et al. | 370/310 |
| 2009/0135716 | A1* | 5/2009 | Veillette | 370/221 |
| 2009/0224906 | A1* | 9/2009 | Balgard et al. | 340/539.1 |

FOREIGN PATENT DOCUMENTS

| | | |
|---|---|---|
| EP | 1480387 A1 | 11/2004 |
| WO | WO-01/41375 A2 | 6/2001 |

OTHER PUBLICATIONS

Perkins et al., "Ad-Hoc On-Demand Distance Vector Routing," AODV, Internet Draft, Nov. 1997.
Ye et al., "GRAdient Broadcast: A Robust Data Delivery Protocol for Large Scale Sensor Networks," Wireless Networks, 2005, pp. 285-298, vol. 11.
Hsu et al., "Prince DHCP: A Prime Numbering Address Allocation Mechanism for MANETs," IEEE Communications Letters, Aug. 2005, pp. 712-714, vol. 9—No. 8.
"Zigbee Specification"(Address assignment and neighbor table Beacons), Zigbee Alliance, May 31, 2007, pp. 370-372 and pp. 414-416. Version 1.0.

* cited by examiner

*Primary Examiner* — Chirag G Shah
*Assistant Examiner* — Minh-Trang Nguyen
(74) *Attorney, Agent, or Firm* — Muncy, Geissler, Olds & Lowe, PLLC (57) ABSTRACT

The present invention discloses an asymmetric routing method and routing path recovery mechanism. The wireless sensor network environment includes at least a management unit, at least a gateway, and mobile nodes. When joining, each mobile node obtains an unique ID code and, additionally, a depth as the gradient to the management unit. Accordingly, a mobile node sends an uplink packet via a nearby node with lower depth to the management unit; while the management unit transmits a downlink packet to a mobile node by utilizing the source route method. When the parent node of a mobile node is damaged or moves to another position or said mobile node with its sub-tree descendants changes their position together, the uplink routing path is recovered via selecting a nearby node of the sub-tree as relay node and the downlink routing path is recovered via sending a control message to the management unit.

13 Claims, 10 Drawing Sheets

ROUTING METHOD AND ROUTING PATH RECOVERY MECHANISM IN WIRELESS SENSOR NETWORK ENVIRONMENT

BACKGROUND OF THE INVENTION

1. Field of the Invention

The present invention relates to a packet routing method for the mobile node in the wireless sensor network, more particularly to a routing method and routing path recovery mechanism applied in the wireless sensor network environment.

2. Description of the Related Art

In general, the Internet Protocol Address (IP address) is used to identify the nodes in the internet. On the other hand, regarding the local area network (LAN), the Media Access Control Address (MAC Address), which represents the physical address of the Ethernet card, is a common means to determine the nodes in the local area network. Similarly, in the wireless sensor network, each mobile node requires an identification code, so as to recognize each other and carry the network packets to the correct destination.

In the wireless sensor network environment, a physical network includes three major parts: the mobile node, the gateway, and the management unit. The mobile node can be any physical network device in the wireless sensor network, and connects each other, to form a tree structure network topology. The gateway is the root node in the tree structure network topology for connecting the mobile nodes in the wireless sensor network to the management unit, or connecting multiple wireless sensor networks to a common management unit. By wireless or wired connection, at least a gateway is utilized for connecting the management unit. Last, the management unit is composed of one or multiple physical network devices, which are connected to the gateway by wire or wireless, for managing the operation of one or multiple wireless sensor networks.

However, the topology of wireless sensor network will be changed constantly due to the damage to the mobile node, or due to the movement of the mobile node. In such circumstance, the routing path should be recovered, and methods for recovery will differ from different types of ID codes.

There are two types of ID codes: routable ID code and non-routable ID code and accordingly two common implements for ID code distribution: Routable ID Distribution Mechanism, and Non-routable ID Distribution Mechanism. The routable ID distribution mechanism (e.g. Zigbee) denotes that the ID code itself carries the routing information. It can perform packet routing solely based on the ID code without any additional route table. Thus, when the network topology changes, the routable ID distribution mechanism has to redistribute the ID codes to mobile nodes and any node in their each sub-trees; otherwise, the routable ID distribution mechanism would not work. However, the redistribution of ID codes not only requires a huge amount of information exchange, but also a long redistribution time so that it would cause disconnection between nodes. That is, the routable ID distribution mechanism is not capable of supporting mobility and fault tolerance. Hence, the mechanism does not work well when a node is damaged or changes its position in the tree topology. Additionally, the non-routable ID distribution mechanism utilizes a routing table to perform packet routing. That is, by using this mechanism the system does not have to redistribute the ID codes, but need to refresh the routing table constantly on any relevant nodes. Same, the refresh method in the non-routable ID distribution mechanism would generate huge amount control messages, and require transporting this information to all nodes. The significant work loading would increase the system burden, and the transporting process would expend more refreshing time. In sum, the non-routable ID distribution mechanism cannot rapidly recover the routing path in real-time manner.

Therefore, to solve the above-mentioned problems, the present invention proposes a novel path routing method and a routing recovery mechanism. The operation of the routing method and the relevant implements are detailed as follows.

SUMMARY OF THE INVENTION

It is therefore one of the many objectives of the claimed invention to provide a routing method in the wireless sensor network environment. The routing method in the present invention utilizes the depth which is corresponding to the distance from the management unit and is stored in each node, accordingly forming a gradient in the network, centered on the management unit. The management unit then distributes the ID code to a new mobile node based on this gradient. The uplink packet routing in the present invention can utilize the gradient to transmit the packet without any ID code. The downlink packet routing can utilize source routing method based on the unique ID code of each node to transmit the packet to the destination node. This asymmetric routing method did not need to redistribute the unique ID code when the network topology is changed.

Another objective of the claimed invention is to provide a routing method and routing path recovery mechanism applied in the wireless sensor network environment. The present invention can rapidly generate a routing path to the gateway when the mobile node is roaming. And the present invention can provide a network structure with the characteristic of load balance and fault tolerance.

Another objective of the claimed invention is to provide a routing method in the wireless sensor network environment. The routing path of the uplink packet in the present invention is determined by the depth.

Another objective of the claimed invention is to provide a routing method in the wireless sensor network environment. The transportation of the downlink packet is based on the ID code of the destination node and the routing information stored in the management unit. The management unit utilizes the source routing method to transmit the downlink packet to the mobile node with the destination ID code.

Another objective of the claimed invention is to provide a routing method in the wireless sensor network environment, wherein the path between each mobile node and the gateway is the shortest path.

According to the claimed invention, a routing method in a wireless sensor network environment is disclosed. The wireless sensor network environment includes a plurality of mobile nodes, at least a gateway, and a management unit. The routing method comprises: the management unit providing an unique ID code for each mobile node; after the mobile node receiving the unique ID code, the mobile node broadcasting a beacon frame periodically to inform other nearby mobile nodes of the existence of the mobile node; each mobile node maintaining a neighbor table for nearby nodes, randomly selecting a nearby node with a lower depth from the neighbor table as the relay node, sending packet to said relay node, and inserting said unique ID code of said mobile node into a header of said packet; and when said relay node receiving said packet, randomly selecting a node closest to said management unit based on its said neighbor table, sending said packet to said closest node, and said packet being transmitted to said management unit through zero or a plurality of said relay nodes. The management unit storing a plurality of routing information, and repacking the packet based on the routing information and a destination ID code of the packet. After passing through the relay nodes, transmitting the packet to the mobile node with the destination ID code.

Also according to the claimed invention, a routing path recovery method in a wireless sensor network environment is disclosed. The routing path recovery method can recover a path when the mobile node with its descendents tries to change the position in the tree structure network topology or the parent node of the mobile node is undetectable. The routing path recovery method comprises: said mobile node transmitting a binding update message to a management unit, and updating a downlink routing path from said management unit to said mobile node; detecting the beacons broadcasted periodically by at least a nearby node and selecting a node as the parent node of said mobile node; and referring the path from said parent node to said management node as the routing path to said management node, and broadcasting the existence of said mobile node to nearby nodes.

Below, the embodiments of the present invention are described in detail in cooperation with the attached drawings to make easily understood the objectives, technical contents, characteristics and accomplishments of the present invention.

DETAILED DESCRIPTION OF THE INVENTION

The present invention provides a routing and routing path recovery method based on the current applied wireless sensor network environment. The present routing method supports roaming for mobile nodes, in which the ID code redistribution is not required and hence the roaming latency is reduced significantly. In addition, the present routing method provides a "fault tolerance" mechanism. When the mobile node's parents damaged or moves to other place, the mobile node can recover its routing path immediately, and therefore routes packets through other nodes. Since the mobile node in the present invention is capable of moving freely without the need of regaining a new ID code, the routing method in the present invention can support any loading balance mechanism as well. For example, taking power consumption or packet flow into consideration, a load balancing mechanism can adjust the number of mobile nodes in each wireless sensor network to optimize the system performance.

Figure 1:
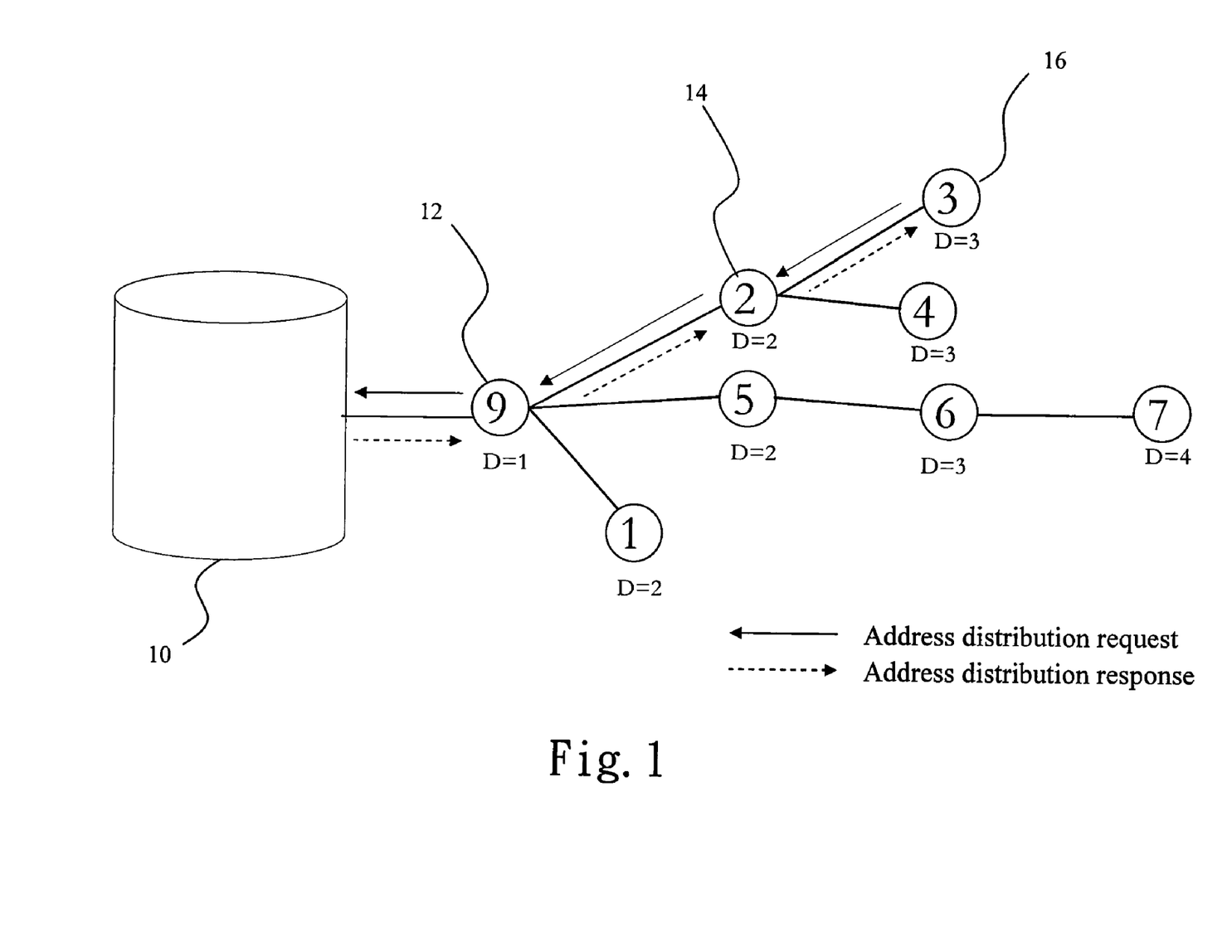
FIG. 1 is a schematic diagram illustrating the method of routing and distributing the unique ID codes to the mobile nodes according to an embodiment of the present invention.

Please refer to FIG. 1. FIG. 1 is a schematic diagram illustrating the method of routing and distributing the ID codes to the mobile nodes according to an embodiment of the present invention. The wireless physical device in this invention includes a management unit 10, a gateway 12, and multiple mobile nodes 14, wherein No.3 mobile node's parent node is No. 2 mobile node, and we define the No. 3 mobile node a number 16. Each mobile node 14 includes a "depth" indicating the distance between the mobile node 14 and the management unit 10. For instance, as shown in FIG. 1, the No. 5 mobile node has a depth D=2. Here, the mobile nodes 14 will monitor the existence of other mobile nodes in the neighborhood, and maintain the neighbor table (not shown) with the nearby nodes. Please note that, since the method of detecting nearby nodes and maintaining the neighbor table is considered well-known in the pertinent art and further details are therefore omitted for brevity.

The management unit 10 provides one unique ID code for each mobile node. For example, as shown in FIG. 1, the unique ID code for the mobile node 16 is denoting (3). After receiving the unique ID code, the mobile node will broadcast a beacon frame periodically so as to inform other nearby mobile nodes of the existence of the mobile node 16. The beacon frame in the present invention includes the unique ID code of the mobile node.

Figure 2:
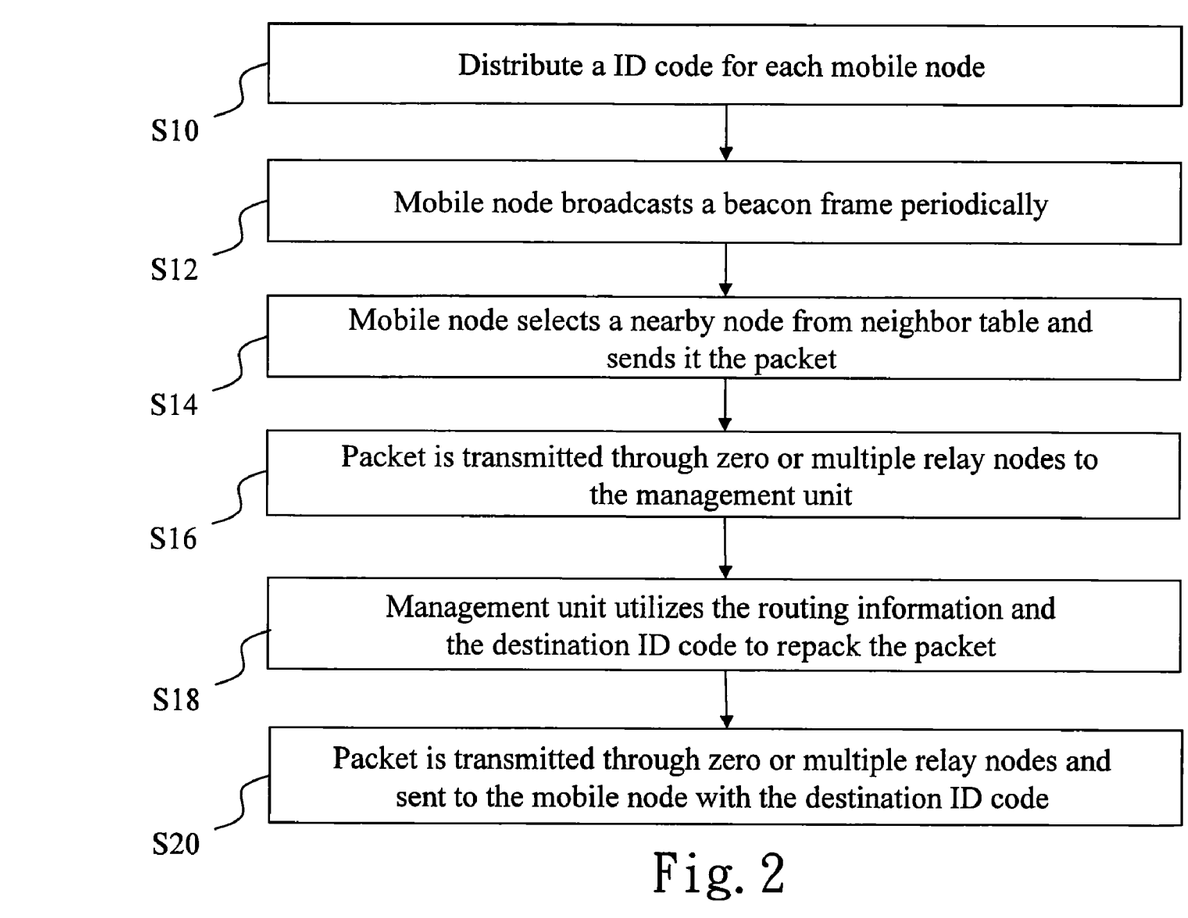
FIG. 2 is a flowchart showing an embodiment of packet routing method according to the present invention.

Please refer to FIG. 2. FIG. 2 is a flowchart showing an embodiment of packet routing method according to the present invention. Provided that substantially the same result is achieved, the steps of the flowchart shown in FIG. 2 need not be in the exact order shown and need not be contiguous, that is, other steps can be intermediate. In step S10, the management unit provides one unique ID code for each mobile node. Next, in step S12, after receiving the unique ID code, the mobile node will broadcast a beacon frame periodically so as to inform other nearby mobile nodes of the existence of this mobile node. As shown in step S14, each mobile node maintains a neighbor table for nearby nodes and randomly selects a node with a lower depth as the "relay node." Then the mobile node will insert its unique ID code into the header of the packet and send the packet to the relay node. Next, in step S16, after receiving the packet, the relay node will randomly select a node, which is closest to the management unit, from its own neighbor table, and send the packet to the closest node. Eventually, through zero or multiple relay nodes, the packet will be sent to the management unit. Step S10~S16 are referred to uplink packet routing method. And the downlink packet routing method is detailed as follows. In step S18, the management unit will re-pack the packet with a destination's ID code and some routing information originally stored in the management unit and sent the packet out. In step 20, through multiple relay nodes, the packet will be received by the mobile node with the destination ID code.

Figure 3:
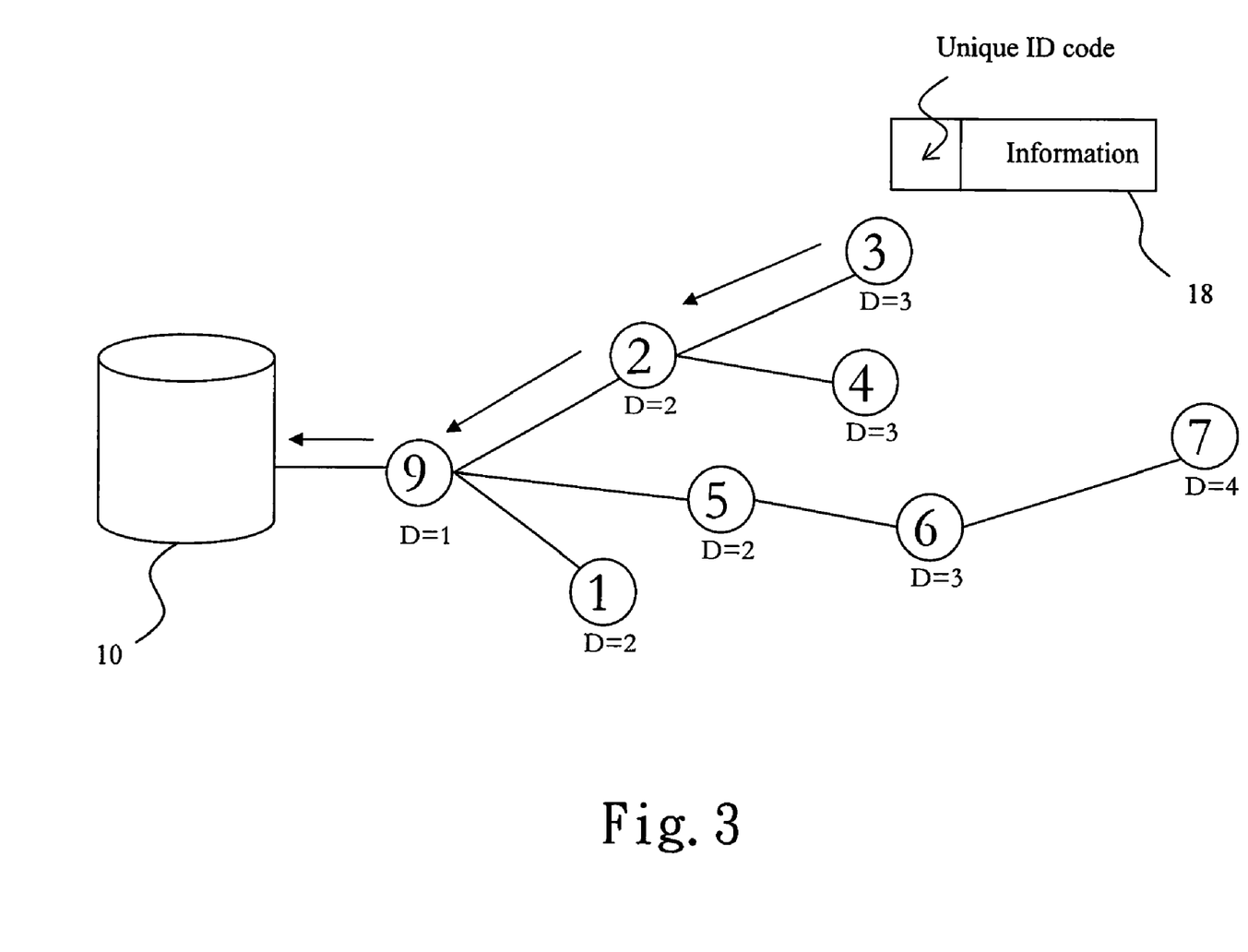
FIG. 3 is a schematic diagram illustrating the method of routing packet from a mobile node to the management unit according to another embodiment of the present invention.

Please refer to FIG. 3. FIG. 3 is a schematic diagram illustrating the method of routing packet from a mobile node to the management unit according to another embodiment of the present invention. As mentioned above, each mobile node broadcasts a beacon frame 18 periodically so as to inform other nearby mobile nodes of the existence of this mobile node, and the beacon frame 18 includes the ID code and the depth information of the mobile node. Moreover, each mobile node maintains a neighbor table for nearby nodes dynamically. Therefore, when the mobile node (3) wants to route the packet to the management unit 10, the mobile node (3) will randomly select a mobile node closest to the management unit based on its neighbor table. In the present embodiment, regarding the mobile node (3), the closest mobile node to the management unit 10 is the mobile node (2), and the mobile node (3) will send the packet to the mobile node (2). That is, the mobile node (2) will become the relay node between the mobile node (3) and the management unit 10. Similarly, when the mobile node (2) and the mobile node (9) receive the packet, they will route and send the packet in the same manner. Finally, the data packet will be sent to the management unit 10.

Typically, the management unit knows about the mapping between the MAC address of the source node and the unique ID code of the source node. Therefore, the mobile node (3) only needs to insert its unique ID code into the header of the packet to identify the source of the packet.

Figure 4:
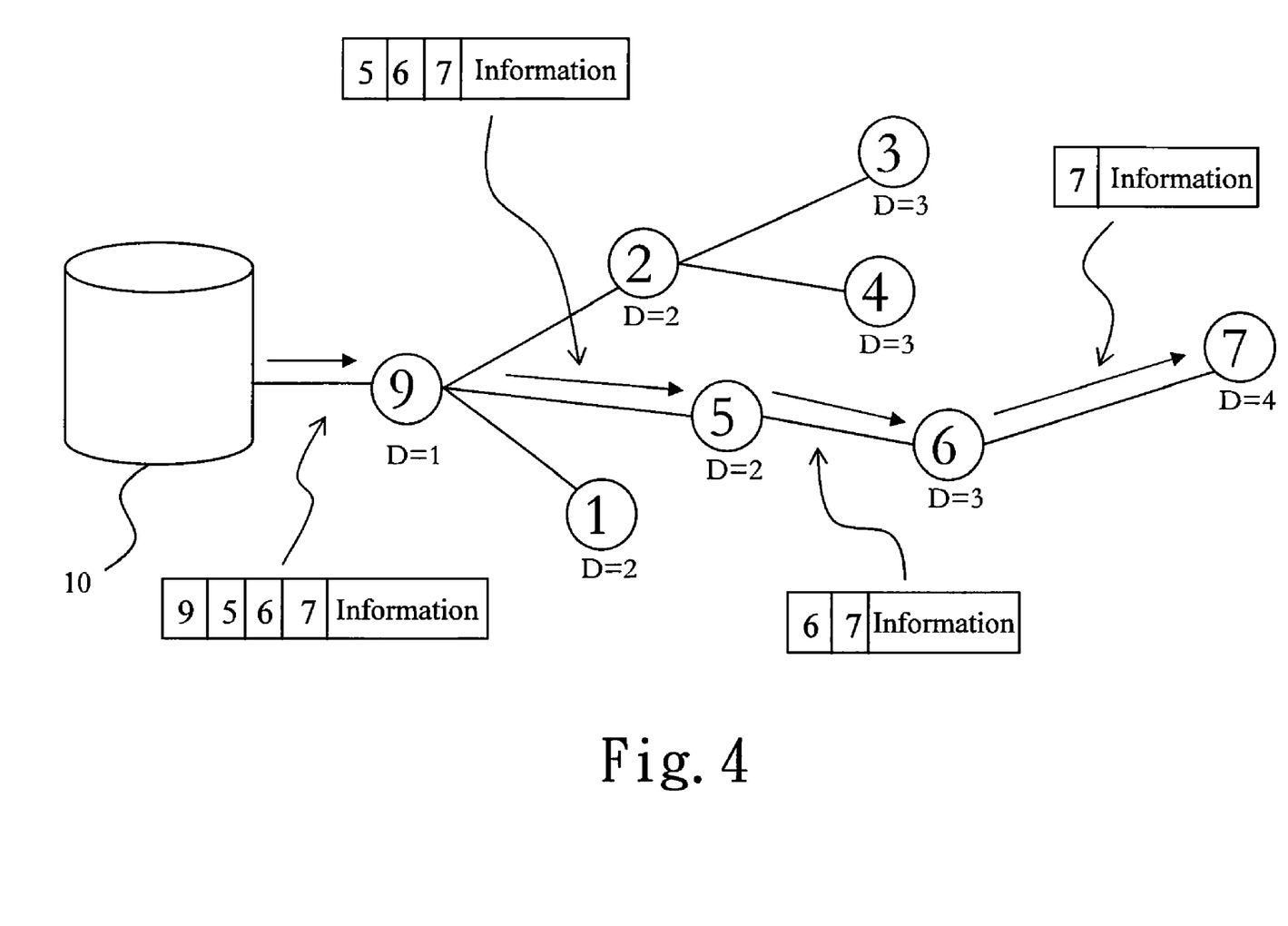
FIG. 4 is a schematic diagram illustrating the method of routing packet from the management unit to the mobile node according to another embodiment of the present invention.

Please refer to FIG. 4. FIG. 4 is a schematic diagram illustrating the method of routing packet from the management unit to the mobile node (7) according to another embodiment of the present invention. Since the management unit 10 is aware of the entire network topology, it can utilized the "source route" method to insert the ID codes all necessary relay nodes, including the relay node (9), (5), (6), and (7), into the header of the packet. Please note that, the source route method is considered well known in the pertinent art and only an example of the present invention, and is not meant to be taken as limitations. That is, as will be easily observed by a personal of ordinary skill in the art, other embodiments of the present disclosure utilizing different routing methods are also possible. Once the relay node receives the data pocket, it can erase its own ID code information from the header of the packet to reduce the waste of bandwidth, and then send the packet to next relay node. In the present invention, all relay nodes are designated by the management unit 10; therefore, each mobile node needs to maintain its own neighbor table only. That is, the mobile node in the present invention does not require maintaining a routing table, which is considered well-known to those skilled in the art, and significantly increase the system's efficiency and performance.

Figure 5:
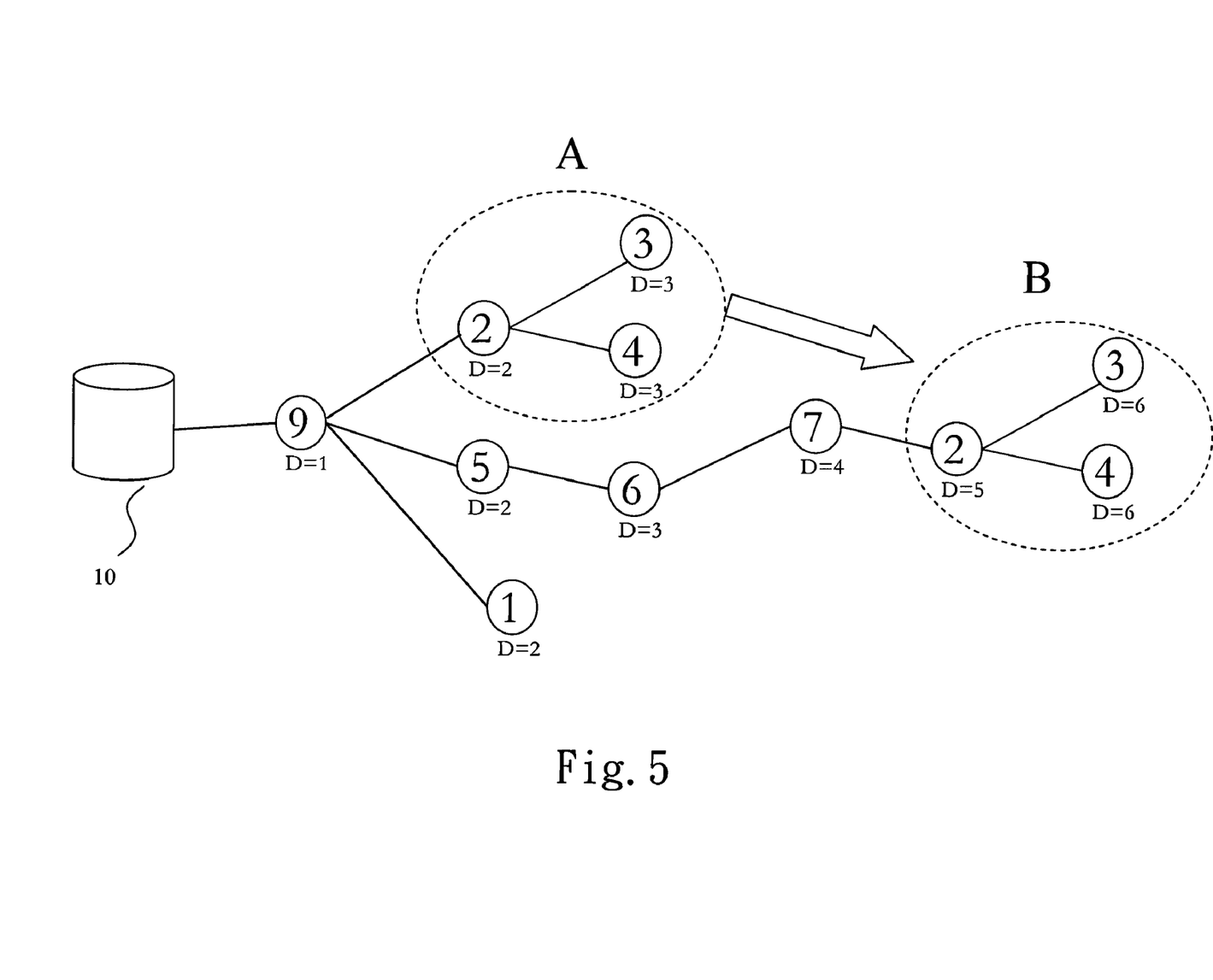
FIG. 5 is a schematic diagram illustrating the method of routing path recovery while one mobile node with its descendants changes the position in the network topology according to another embodiment of the present invention.

For some reasons the mobile node may have to roam within the wireless sensor network. For example, in FIG. 5, the mobile node (2) with its sub-tree descendants wants to move from position A to position B. After moving to position B, the mobile node (2) is no longer connecting to the parent node (9). Thus the mobile node (2) will send "binding update" information to the management unit 10 to update the downlink routing path of the mobile node (2) stored in the management unit 10. Because the network topology path in the management unit 10 is stored based on tree structure, the downlink routing paths for the mobile node (2) and the nodes in the mobile node (2)'s sub-tree will be updated at the same time. Next, the mobile node (2) can detects the regularly broadcasting beacons of its new nearby nodes and select a mobile node as its parent node (7) from the neighborhood. Regarding the update of the uplink packet path, since the unlink packet routing is based on the depth, if the depth of the mobile node (2) is changed, the mobile node (2) has to broadcast a control message to its sub-tree, so as to update the depth information for all nodes in the sub-tree, and then the uplink packet path can be repaired.

Figure 6:
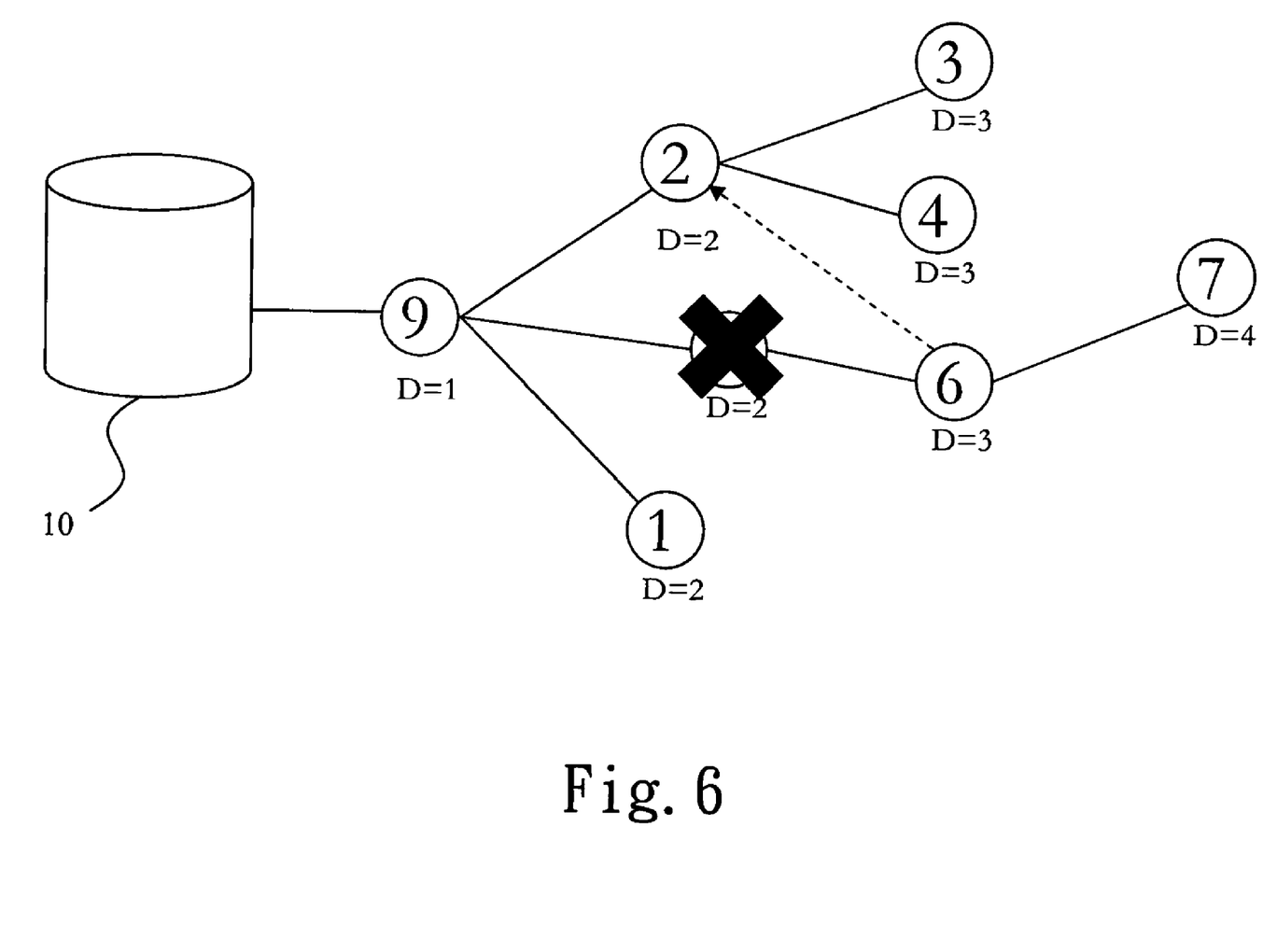
FIG. 6 is a schematic diagram illustrating the fault tolerance mechanism while one mobile node is damaged in the uplink routing path according to another embodiment of the present invention.

Please refer to FIG. 6. FIG. 6 is a schematic diagram illustrating the fault tolerance mechanism while one mobile node is damaged in the uplink routing path according to another embodiment of the present invention. As shown in FIG. 6, when the mobile node (6) sending a data packet to the management unit 10 and the mobile node (5) is damaged, the mobile node (6) will randomly select other mobile node (i.e. the mobile node (1) or (2)) close to the management unit 10 as the "next hop" to route the packet. In this embodiment, the mobile node (6) selects the mobile node (2) as the next hop.

Figure 7:
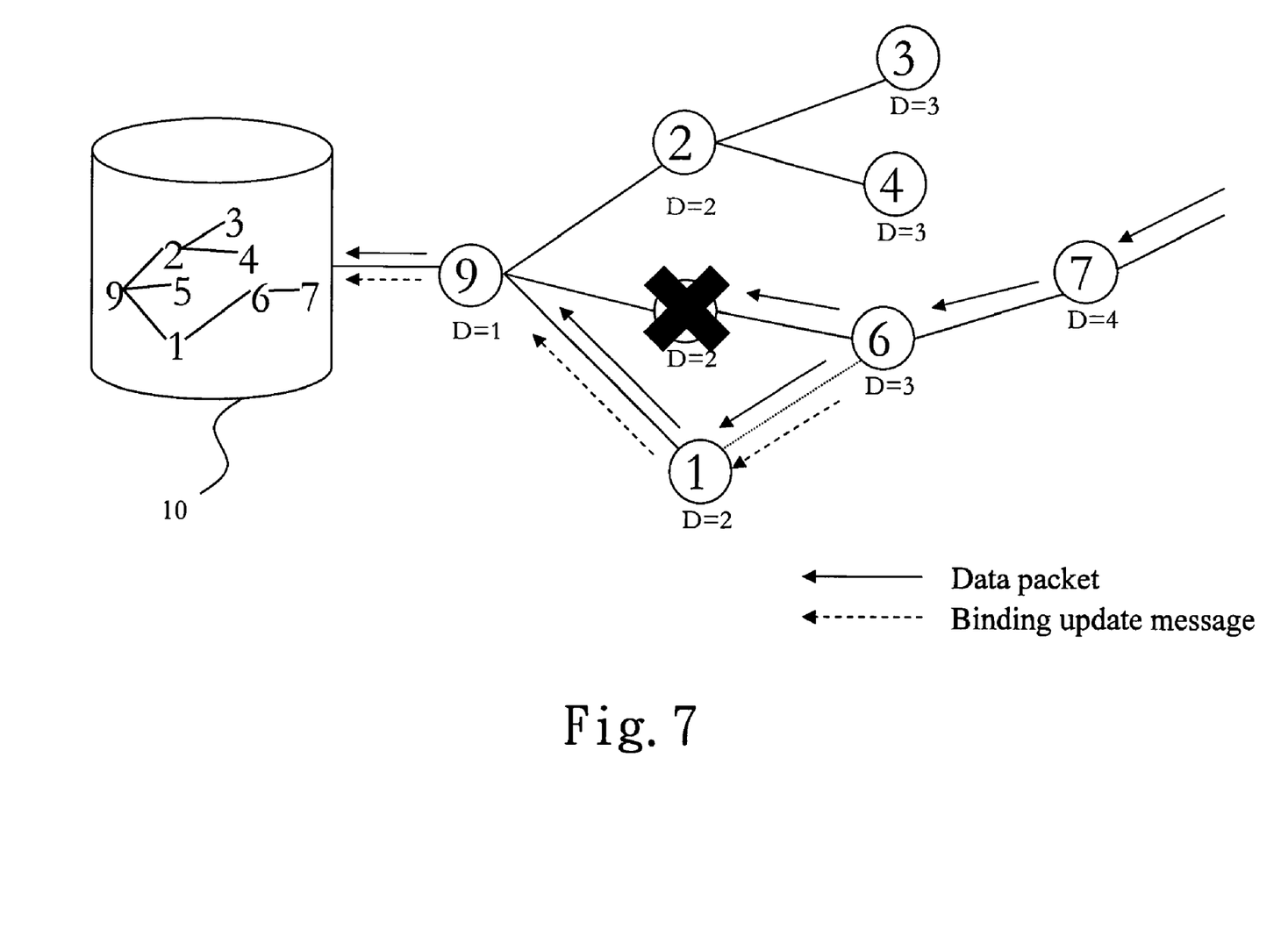
FIG. 7 is a schematic diagram illustrating the fault tolerance mechanism while one mobile node is damaged in the uplink routing path according to another embodiment of the present invention.

Considering the calculation complexity and the information maintenance complexity, the network topology is stored in the management unit and is tree-structured. This tree structure, as shown inside the management unit 10 in FIG. 7, records and interprets the relationship among all mobile nodes, hence recording all routing paths to each node in the wireless sensor network. When the mobile node (6) requires routing a data packet to the management unit 10, in the meantime, the parent node of the mobile node (6) (i.e. the mobile node (5)) is unpredictable damaged. The mobile node (6) will immediately select other nearby node to send the packet and send a binding update message to the neighborhood at the same time. The binding update message will collect all ID codes for passed mobile nodes, and inform the management unit 10 to revise the network topology structure, and then recover the downlink routing path. If the management unit 10 requires sending a data packet to the mobile node (7), since the network topology has been repaired, the data packet can be passed through the mobile node (9), (1), (6), and (7), and finally sent to the mobile node (7).

Figure 8:
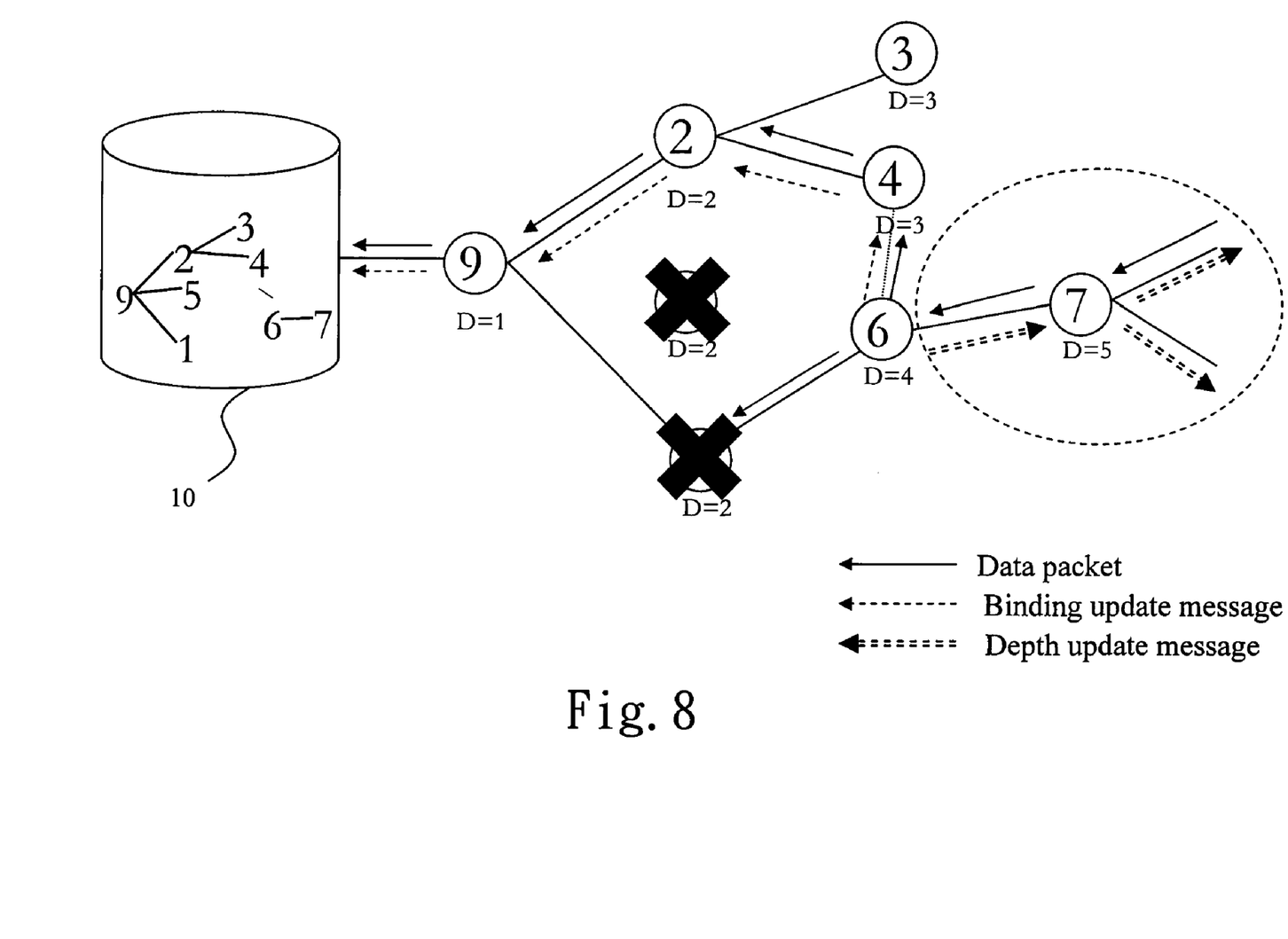
FIG. 8 is a schematic diagram illustrating the fault tolerance mechanism while two mobile nodes are damaged in the uplink routing path according to another embodiment of the present invention.

In some situations the routing path can not be repaired by signal message transportation. As shown in FIG. 8, both the mobile node (5) and the mobile node (1) are damaged. Because there is no other node close to the management unit 10 in the neighborhood of the mobile node (6), the mobile node (6) has to broadcast not only the binding update message, but also a "depth update" message to its sub-tree (as shown in the dotted line area) to inform the following mobile nodes of updating the depth information and maintaining the uplink routing path.

Figure 9:
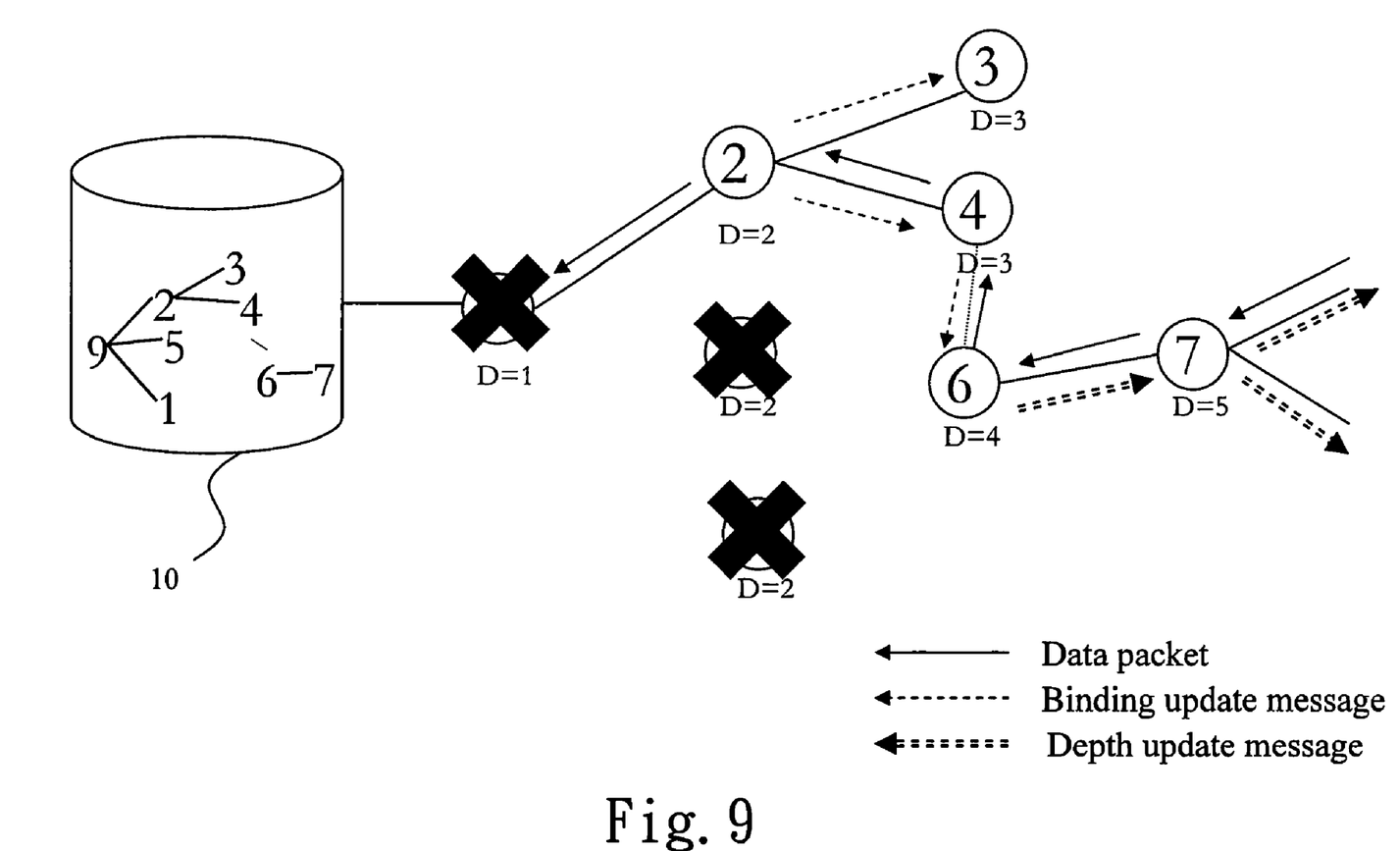
FIG. 9 is a schematic diagram illustrating the fault tolerance mechanism while three mobile nodes are damaged in the uplink routing path according to another embodiment of the present invention.

Please refer to FIG. 9. In some situations, the gateway (9) might be removed or shut down by the network setup personnel, or encountered unpredictable damage. That is, the mobile node (2) will find out its parent node is damaged. But there is no other close node which can route the data packet. In this scenario, the mobile node (2) will broadcast to all sub-nodes and look for another routing path to the management unit. Same, the mobile node (4) will try to find any possible routing path once it receives the binding update message from the mobile node (2). If it find out there is a node closed to the management unit in the neighborhood, the mobile node will route the binding update message by the "unicast" manner. Otherwise, the binding update message will be kept broadcasting in the sub-tree.

Figure 10:
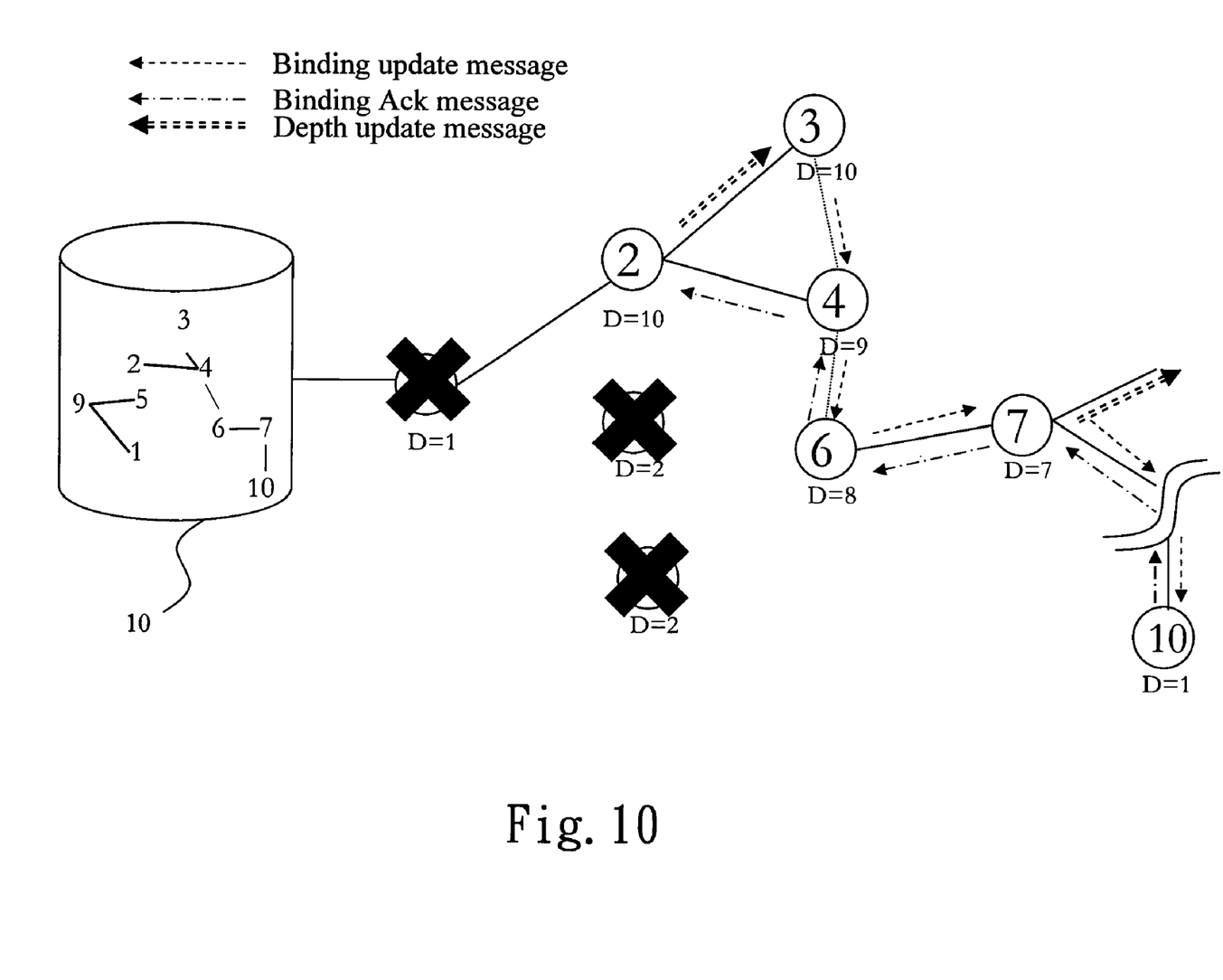
FIG. 10 is a schematic diagram illustrating the fault tolerance mechanism while three mobile nodes are damaged in the uplink routing path according to another embodiment of the present invention.

Please refer to FIG. 10. If the management unit is connecting to a gateway (10) and receiving a binding update message from the mobile node (2), the management unit will wait for a while and try to gather multiple routing paths to and from the mobile node (2). Next, the management unit will select a better routing path from those paths. After selecting the path, the management unit will update the inner network topology structure. At this time, the downlink routing path is completely recovery. Next, the management unit will utilize the source route mechanism to reply a binding update response message to the mobile node (2). And once the binding update response message is received by any relay mobile node, the mobile node will update its own depth information in the message. If the depth information is changed, the mobile node will broadcast the depth update message to the sub-tree respectively, which can keep the information for all uplink routing path accurate.

As shown and illustrated in FIG. 5 to FIG. 10, the routing method and routing recovery mechanism in the current invention can precisely perform fault tolerance of the routing path and rapidly repair the routing path while the mobile node is damaged. Moreover, the uplink packet can be sent through the shortest path to the management unit, which can significantly extend the lifetime of the entire network.

In sum, the routing method and routing path recovery mechanism in the present invention provide a rapid process to generate and recover a routing path to a specific gateway while the mobile node is roaming. And the routing method and routing path recovery mechanism in the present invention can provide a network structure with the characteristic of load balance and fault tolerance. Moreover, the asymmetric routing method in the present invention routes the uplink packet based on the gradient, which means no ID code required. And for routing downlink packet the management unit in the present invention can base on the only ID code in each node, and utilize source route method to route the path to the destination node.

In contrast to the related art, the routing method in the present invention has the following advantages: the management unit can uniform and distribute the ID code for each mobile node; without renewing the ID code of the mobile node when the network topology is changed; determining the uplink routing path based on the depth; and efficiently distribute the ID codes by central controlling and managing the downlink packet routing path.

Those described above are only the preferred embodiments to exemplify the present invention but not to limit the scope of the present invention. Any equivalent modification or variation according to the shapes, structures, features and spirit disclosed in the specification is to be also included within the scope of the present invention.

What is claimed is:

1. A routing method in a wireless sensor network environment, wherein said wireless sensor network environment comprises a plurality of mobile nodes, at least a gateway, and a management unit, and said routing method comprises:
   said management unit being aware of a relationship between a MAC address of said mobile node and an unique ID code and providing an unique ID code for each said mobile node, and maintaining a tree structure network topology and corresponding relationship between said MAC address and said unique ID code in a database, and transmitting an address distribution response message to said mobile node for downlink routing paths;
   after said mobile node receives said unique ID code, said mobile node broadcasting a beacon frame periodically to inform other nearby mobile nodes of the existence of said mobile node;
      each said mobile node maintaining a neighbor table for nearby nodes, randomly selecting a nearby node with a lower depth as a relay node, sending a packet to said relay node, and inserting unique ID code of said mobile node into a header of said packet; and
      when said relay node receives said packet, randomly selecting a node closest to said management unit based on its said neighbor table, sending said packet to said closest node, and said packet being transmitted to said management unit through zero or a plurality of said relay nodes.

2. The routing method in a wireless sensor network environment of claim 1, wherein said gateway is coupled to said mobile node and said management unit.

3. The routing method in a wireless sensor network environment of claim 1, wherein said beacon frame comprises said unique ID code and a depth which is a distance between said mobile node and said management unit.

4. The routing method in a wireless sensor network environment of claim 1, wherein said relay node is a closest node to said management unit and is selected from said neighbor table of said mobile node.

5. The routing method in a wireless sensor network environment of claim 1, wherein said management unit transmits said packet to said mobile node and inserts a plurality of said unique ID codes of passed relay nodes into the header of said packet based on a source route method.

6. The routing method in a wireless sensor network environment of claim 5, wherein after receiving said packet, said relay node deletes its unique ID code from said header and transmits said packet to next relay node.

7. The routing method in a wireless sensor network environment of claim 1, wherein the step of said management unit routing said packet to a mobile node further comprises:
   said management unit storing a plurality of routing information, and repacking said packet based on said routing information and a destination ID code of said packet; and
   after passing through a plurality of said relay nodes, transmitting said packet to said mobile node with said destination ID code.

8. A routing path recovery method in a wireless sensor network environment, wherein said routing path recovery method can recover a path when a mobile node with its descendents tries to change position in a tree structure network topology or a parent node of said mobile node is undetectable, comprising:
   said mobile node detecting periodically broadcasted beacons from nearby nodes and utilizing said beacons to immediately select a nearby node which is a node in said mobile node's neighborhood as a parent node of said mobile node;
   said mobile node transmitting a binding update message to a management unit immediately, and said management unit updating the tree structure network topology of a downlink routing path from said management unit to said mobile node;
   referring a path from said parent node to said management node as a path of said mobile node to said management unit, and said mobile node starting to periodically broadcast beacons to inform nearby nodes of existence of said mobile node; and
   if said parent node is found, said management unit sent a response to said mobile node, said mobile node broadcasting a depth update message to a sub-tree of said mobile node to update depth information of a plurality of nodes in said sub-tree, hence repairing uplink packet routing paths;
   if said parent node is not found, broadcasting said binding update message to said sub-tree of said mobile node to find a neighbor node which is a node in said mobile node's neighborhood, and broadcasting a depth update message to a sub-tree of said mobile node to update depth information of a plurality of nodes in said sub-tree, hence repairing uplink packet routing paths.

9. The routing path recovery method in a wireless sensor network environment of claim 8, wherein the information of said downlink routing paths is stored in said tree structure network topology of said management unit.

10. The routing path recovery method in a wireless sensor network environment of claim 8, wherein an uplink packet of said mobile node is transmitted through a relay node with a lower depth among a plurality of nearby nodes and then routed to said management unit.

11. The routing path recovery method in a wireless sensor network environment of claim 8, wherein the step of said mobile node transmitting said binding update message further comprises: gathering unique ID codes of all passed nodes.

12. The routing path recovery method in a wireless sensor network environment of claim 8, wherein said management unit is coupled to a gateway, when said gateway is closed, if said depth of said mobile node is second to said gateway and there is no other node with same depth, said mobile node will broadcast said binding update message to the sub-tree of said mobile node and try to find another routing path.

13. The routing path recovery method in a wireless sensor network environment of claim 8, wherein said parent node is not found but a new neighbor node which is neighborhood with a node under said sub-tree of said mobile node is found, and said new neighbor node is closer to said management unit, said mobile node will utilize unicast method to route and transmit a message to said new neighbor node.

* * * * *